Jan. 31, 1967    G. M. GROVER ET AL    3,302,042
NUCLEAR REACTOR WITH THERMIONIC CONVERTER
Filed Oct. 23, 1965    2 Sheets-Sheet 1

INVENTOR.
George M. Grover, Claus A. Busse,
Josef Bohdansky
BY

INVENTOR.
George M. Grover, Claus A. Busse,
Josef Bohdansky

United States Patent Office

3,302,042
Patented Jan. 31, 1967

3,302,042
NUCLEAR REACTOR WITH THERMIONIC CONVERTER
George M. Grover, Los Alamos, N. Mex., and Claus A. Busse, Laveno, and Josef Bohdansky, Taino, Italy, assignors, by direct and mesne assignments, to the United States of America as represented by the United States Atomic Energy Commission
Filed Oct. 23, 1965, Ser. No. 504,270
4 Claims. (Cl. 310—4)

This invention relates to a nuclear reactor and, more particularly, to a reactor for the direct conversion of heat to electricity.

In nuclear reactors heretofore constructed, the extraction of heat produced by nuclear fission requires in general the circulation of a heat extracting medium between the heat generating zone and an external heat cooling device, dissipating or transforming heat into power, and reintroducing the cooled-down medium into the heat generating zone. For this purpose, an often rather complicated system of cooling channels passes through the reactor which is connected externally to a corresponding circulating system. Furthermore pumps and other components for the circulation and control of the media in the cooling channels are required.

With the invention of the "heat pipe" an entirely new technique of heat transfer has come to life, see Grover, Cotter and Erickson, Structures of Very High Thermal Conductance, 35 Journal of Applied Physics 1990 (June 1964), and application Serial Number 327,559 filed December 2, 1963 by George M. Grover, now Patent 3,229,759, dated March 29, 1966. A "heat pipe" is a transfer device comprising a container, condensable vapor, and capillary means disposed within the container capable of causing the transport of the condensed vapor from a cooler area of the container to a hotter area. The transport of the vapor through the container uses, as the driving force, the difference in vapor pressures in the high temperature zone and the cold temperature zone. The liquid which condenses in the cold zone is returned to the evaporation zone by capillary action. Thus, fluid circulation is established in the pipe with the non-heated end of the pipe acting as a condenser. By means of this circulation, a heat flux is created to flow from the heated end of the pipe to the pipe's non-heated end. The temperature drop along the heat pipe is powers of ten lower than in the case of conventional heat transports. Therefore, an essentially uniform temperature distribution is established along the entire pipe surface.

Accordingly, it is an object of the present invention to provide a nuclear reactor which directly converts the heat produced by fission to electricity.

It is another object to provide a nuclear reactor wherein all the waste heat is dissipated solely by the heat transfer mechanism of radiation.

It is another object to provide a nuclear reactor useful as a power source in space.

It is another object to provide a nuclear reactor wherein no separate coolant is necessary or pumps necessary to circulate the coolant.

It is another object to provide a nuclear reactor which directly converts the heat produced by fission to electricity under gravity free conditions.

It is another object to provide a thermionic converter which is removed from the immediate radiation field of a nuclear reactor which constitutes the heat source for the thermionic converter.

It is a further object to provide a nuclear reactor for space vehicles for the direct conversion of nuclear energy into electrical energy.

The present invention utilizes heat pipes in a nuclear reactor as the heat transferring elements. According to the invention, nuclear core components, especially the fuel elements, involved in fission, moderation, and reflection are thermally coupled to heat pipes. The non-coupled portions of the pipes extend outward from the reactor core to constitute thermal sinks. The condenser region of the heat pipe terminates in an emitter electrode of a thermionic converter. Furthermore, the front face of the heat pipe can directly constitute the emitter electrode in a thermionic converter. If desired, the front face can be vapor-plated with a special electron emissive layer. Finally, the collector electrode of the thermionic converter can be coupled to a heat pipe for the removal of heat generated in the collector.

Various other objects and advantages will appear from the description of the following embodiment of the invention, and the novel features will be pointed out thereinafter in connection with the claims.

The invention will be clearly understood by reference to the accompanying two sheets of drawings wherein.

Figure 1:
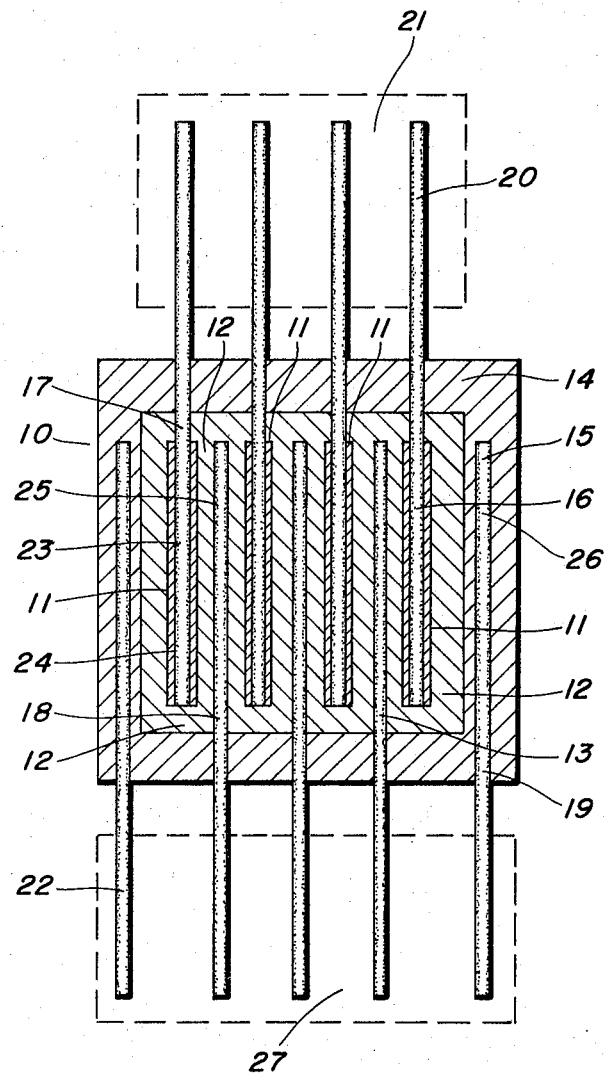
FIG. 1 is a vertical sectional view of a moderated nuclear reactor equipped with heat pipes.

In the illustrated embodiment of the invention as seen in FIG. 1, a heterogeneous nuclear reactor 10 is provided with fissile fuel 11 having a passageway 16, moderator 12 having a passageway 13 extending partially therethrough, and reflector 14 having a passageway 15 extending partially therethrough.

Disposed in passageway 16 of fissile fuel 11, passageway 13 of moderator 12, passageway 15 of reflector 14 and thermally coupled thereto are fissile fuel heat pipe 17 having an evaporator region 24, moderator heat pipe 18 having evaporator region 25, and reflector heat pipe 19 having an evaporator region 26 respectively. The non-coupled portion 20 defining a condenser region for heat pipe 17 extends outwardly from the nuclear reactor 10 to constitute a heat sink 21. The non-coupled portion 22 defines a condenser region for heat pipes 18 and 19 and constitutes heat sink 27.

The inner walls of heat pipes 17, 18, and 19 are covered with a wick 23 of suitable capillary structure. Only the wick 23 disposed within fissile heat pipe 17 is numbered in FIG. 1. It is a requirement that the pore size be sufficiently small to produce capillary action and that the material utilized be compatible at the condition of operation. The tubular fissile fuel 11 may be separately mounted on heat pipe 17 or the fissile fuel may be lined directly on the outer surface of the heat pipe. As a fissile fuel, a Mo-UO$_2$ cermet may be employed. Fissile fuel heat pipe 17 may be formed from tantalum. Fissile fuel heat pipe 17 contains silver as a heat carrier fluid and operates at a temperature of about 1800° C. Moderator heat pipe 18 and reflector heat pipe 19 may be formed of niobium and contain cesium as the heat carrier fluid.

In FIG. 1 means for controlling the reactor along with the biological and thermal shielding have been omitted. Such means are well within the scope of one skilled in the subject art. If the moderator is to be maintained at a temperature cooler than the fuel temperature, thermal shields must be inserted at least between these two components.

Figure 2:
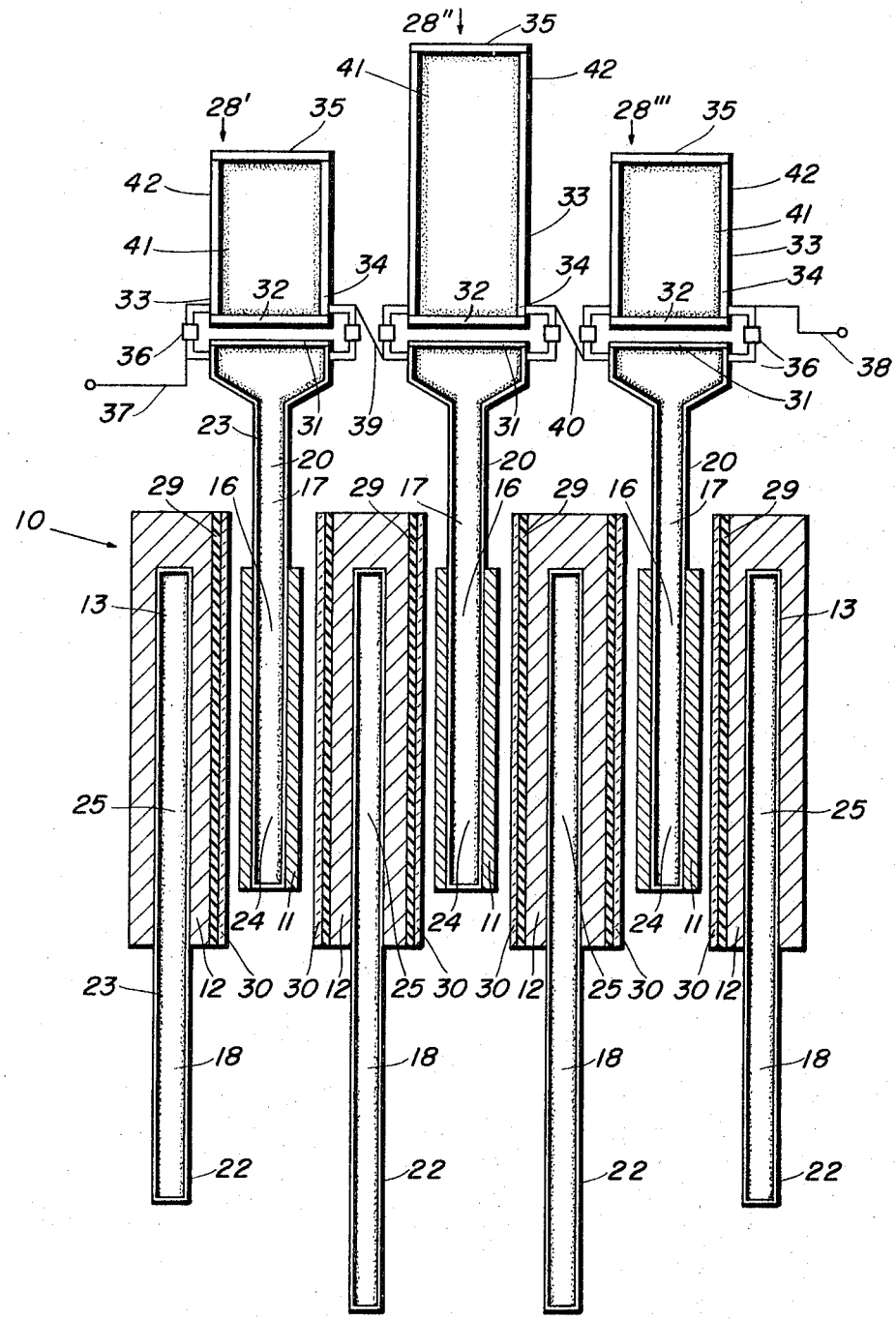
FIG. 2 is a vertical sectional view of a moderated nuclear reactor with thermionic converters equipped with heat pipes.

The lilustrated embodiment of the invention, as shown in FIG. 2, is an adaptation of the reactor 10 shown in FIG. 1 and is employed to heat thermionic converters 28', 28" and 28"' in a vacuum environment. In FIG. 2, a heterogeneous nuclear reactor 10 is shown comprised of a fissile fuel 11 having a passageway 16, and moderator 12 having a passageway 13 extending partially therethrough. The reflector 14 of FIG. 1 is not shown in FIG. 2, although a reflector may be disposed about the moderator 12 as is shown in FIG. 1.

Disposed in passageway 16 of fissile fuel 11, passageway 13 of moderator 12, and thermally coupled thereto are fissile fuel heat pipe 17 having an evaporator region 24 and moderator heat pipe 18 having evaporator region 25 respectively. The non-coupled portions 20 defining a condenser region for heat pipe 17 extend outwardly from the nuclear reactor 10. The non-coupled portion 22, external to reactor 10, defining a condenser region for heat pipe 18 defines a heat sink region.

The inner walls of heat pipes 17 and 18 are covered with a wick 23 of suitable capillary structure. Only wick 23 disposed within one of the fissile heat pipe 17 and moderator pipe 18 is numbered in FIG. 2. It is a requirement that the pore size be sufficiently small to produce capillary action and that the material utilized be compatible at the condition of operation. The moderator 12 formed of zirconium hydride is separated from fissile fuel 11 by means of electrical insulation 29 and thermal shields 30.

The non-coupled portion 20 defining a condenser region of heat pipe 17 which extends beyond reactor 10 carries electron emitter electrode 31. Secured to heat pipe 17 is electrical insulator 36. Carried by electrical insulator 36 is collector electrode 32. Collector heat pipe 33 wherein the region nearest the collector defines an evaporator region 34 is in turn carried by collector electrode 32. Collector heat pipe 33 is provided with end closure member 35 so as to define a condenser region 42. The inner walls of heat pipe 33 are covered with a wick 41 of suitable capillary structure.

In FIG. 2, three thermionic converters 28', 28'', 28''' are illustrated. The collector electrode of converter 28' is electrically connected to the emitter electrode of converter 28'' by electrical connection 39. Likewise, the collector electrode of converter 28'' is electrically connected to the emitter electrode of converter 28' by electrical connector 40. Emitter electrode 31 of converter 28' and collector electrode 32 of converter 28''' are provided with electrical conductors 37 and 38 respectively.

By disposing the thermionic converter 28 outside the reactor 10, the thermionic converter is withdrawn from the immediate radiation field of the reactor.

Heat pipe 17 is preferably formed of tantalum and contains silver as the carrier medium. Moderator heat pipe 18 is preferably formed of niobium and contains cesium as the carrier medium. Collector heat pipe 33 is preferably formed of niobium-zirconium, Nb=1 Zr and contains lithium as the carrier medium.

As in the case of FIG. 1, the control elements of the reactor and other structural components are not shown. Such elements and structural components are well known to those skilled in the nuclear reactor art.

In operation, heat from fission in reactor 10 is applied to evaporator region 24 of heat pipe 17 which is thermally coupled to fissile fuel 11. After the heat is applied, the silver within heat pipe 17 becomes liquified and saturates wicks 23. In liquified steady state heated conditions, the liquid temperature in evaporator region 24 is slightly higher than the non-coupled condenser region 20 of heat pipe 17. The liquified silver in evaporator region 24 vaporizes under the application of the heat from fission in reactor 10. Due to the difference in liquid temperature between evaporator region 24 and the condenser region 20 of heat pipe 17, the resulting difference in pressure in vapor drives the vapor from evaporator region 24 to condenser region 20. The vapor arrives at condenser region 20 wherein emitter electrode 31 acts as a heat sink so as to condensate the vapor to a liquid, filling the pores of the wick 23 and increasing the radius of curvature of the liquid surface in the wick. In the evaporator section 24, the evaporation of liquid from the pores of the wick causes a reduction of the radius of curvature of the liquid surface, as the liquid is evaporated from the pores, to a limit of the radius of curvature of the pores in the wick. As described in the reference on "heat pipes" by Grover, Cotter and Erickson, the pressure in the liquid is reduced in proportion to the radius of curvature of the liquid surface. Therefore, the pressure in the liquid is reduced proportionately more in the evaporator section of the wick than in the condenser section of the wick. The pressure differential drives the liquid through the wick 23 from the condenser region 20 to the evaporator region 24 against the various retarding forces.

Emitter electrode 31 heated by heat pipe 17 emits electrons which flow from emitters 31 to collectors 32. Insulators 36 maintain the spacing between and provide electric isolation between emitters 31 and collectors 32 The electromotive force generated between emitter electrode 31 and the collector electrode 32 is taken off by means of electrical conductors 37 and 38 to a load (not shown). The electron flow from the emitter to the collector is primarily dependent upon the absolute temperature of the emitter and secondarily, on the thermal gradient between the hot emitter and the "cold" collector. By employing silver as the carrier medium in heat pipe 17, the emitter electrode 31 operates at a temperature of about 1800° C.

In order to provide a substantial temperature differential between the hot emitter and the cold collector as all thermionic converters require, the heat generated by the electrons from emitter 31 impinging on collector 32 must be removed from collector 32. Thus the heat generated liquifies the lithium so as to saturate wick 41 within heat pipe 33. In the steady state heated condition, the liquid temperature in the evaporator region 34 of heat pipe 33 is slightly higher than the condenser region 42. The heat generated further vaporizes the liquid lithium in evaporator region 34. Due to the difference in liquid temperature between evaporator region 34 and condenser region 42, the resulting difference in pressure drives the lithium vapor from the evaporator region 34 to condenser region 42. The vapor upon reaching condenser region 42 transfers heat to a heat sink (not shown). A suitable heat sink is apparent to those skilled in the art which may be in the form of a heat exchanger or in the case of dissipating heat in space, the free end of collector heat pipe 33 acts directly as a radiator. Upon transfer of heat to a heat sink, the vapor condenses to a liquid at condenser region 42 and thus creates a pressure differential with respect to the evaporator region 34. The pressure differential drives the liquid through wick 41 from condenser region 42 to evaporator region 34 against the various retarding forces. Thus, the collector 32 operates at a temperature of about 1000° C.

In that thermionic converters require a substantial temperature differential between the hot emitter and the cold collector, it is seen that the remarkable heat transfer rate, with very small temperature gradient associated with the heat pipe permits the efficient operation of this device.

Likewise, heat pipes 18 and 19 shown in FIG. 1 are partially inserted in the moderator and reflector of reactor 10 to extract heat generated in them in a manner set forth as above. With the utilization of cesium as a carrier medium for heat pipes 18 and 19 an operating temperature of 500° C. is achieved.

Due to the physical properties of the heat pipe, heat extraction takes place with extremely small temperature drop. Especially it eliminates conventional coolant circulation system, which is complicated, power consuming, and neutron absorbing. For utilization of the reactor on earth, the reactor is preferably operated with the heat pipes horizontally mounted. If the free portions of the heat pipes are curved upwards, the reflux of the condensate is aided by gravity. As may be seen from the figures, the heat pipes above and below the reactor 10 have different lengths. By this means, first a spatial configuration is achieved, which is particularly advantageous for incorporation of the invention in rockets. Second, favorable conditions for heat radiation are achieved. Third, the parallel arrangement of the heat pipes accommodates test runs of the reactor under conditions of gravity as already pointed out above.

It will be understood that various changes in the details, such as vapor-plating the emitter electrode 31 with an electron emitting layer, or introducing cesium between the emitter and collector electrode, or utilizing the front face of heat pipe 17 directly as the emitting electrode; steps and arrangement of parts, which have herein been described and illustrated in order to explain the nature of the invention may be made by those skilled in the art within the principle and scope of the invention as expressed in the appended claims.

What is claimed is:

1. In a nuclear reactor core having fissile fuel and a moderator, a heat extraction system comprising:
   a first heat pipe having one end interior to the reactor core and thermally coupled to the fissile fuel and being heated thereby, the other end being exterior to the core;
   a nemitter electrode thermally coupled to the end of said first heat pipe which is exterior to the core;
   a collector electrode electrically isolated from said emitter electrode and disposed so as to collect electrons emitted from said emitter electrode;
   a second heat pipe, one end of which is thermally coupled to said collector electrode and heated thereby and the other end of which is disposed for heat rejection by radiation;
   a third heat pipe having one end interior to the reactor core and thermally coupled to the moderator and heated thereby the other end being exterior to the reactor core for heat rejection by radiation;
   a condensible vapor disposed within each of said first second and third heat pipes;
   capillary means covering the entire inner surfaces of said first, second and third heat pipes for causing the transport of said condensible vapor within each respective heat pipe from the pipe's unheated end to its heated end whereby heat is extracted from the reactor.

2. A heat extraction system according to claim 1 wherein the condensible vapor is silver.

3. A heat extraction system according to claim 1 wherein the condensible vapor in the second heat pipe is lithium.

4. A heat extraction system according to claim 1 wherein there is a plurality of first, second and third heat pipes each lined with capillary means and each having therein a condensible vapor; and, there is a plurality of collector and emitter electrodes corresponding to the number of first and second heat pipes.

References Cited by the Examiner

UNITED STATES PATENTS

| 3,229,759 | 1/1964 | Grover | 62—487 X |
| 3,243,613 | 3/1966 | Grover | 176—39 X |

FOREIGN PATENTS 1,147,218  6/1957  France.

REUBEN EPSTEIN, *Primary Examiner.*